US012337318B2

(12) United States Patent
Taher et al.

(10) Patent No.: US 12,337,318 B2
(45) Date of Patent: Jun. 24, 2025

(54) FLOW CONTROL SYSTEM FOR A MICROFLUIDIC DEVICE, MICROREACTOR SYSTEM, DNA SYNTHESIS DEVICE, AND METHOD FOR CONTROLLING A SEQUENCE OF REACTIONS

(71) Applicant: IMEC VZW, Leuven (BE)

(72) Inventors: Ahmed Taher, Heverlee (BE); Benjamin Jones, Kessel-Lo (BE)

(73) Assignee: Imec VZW, Leuven (BE)

( * ) Notice: Subject to any disclaimer, the term of this patent is extended or adjusted under 35 U.S.C. 154(b) by 882 days.

(21) Appl. No.: 17/390,397

(22) Filed: Jul. 30, 2021

(65) Prior Publication Data

US 2022/0032305 A1 Feb. 3, 2022

(30) Foreign Application Priority Data

Jul. 30, 2020 (EP) .................................... 20188567

(51) Int. Cl.
*B01L 3/00* (2006.01)
*B01J 19/00* (2006.01)

(52) U.S. Cl.
CPC ..... *B01L 3/502746* (2013.01); *B01J 19/0046* (2013.01); *B01J 19/0093* (2013.01); *B01L 3/502738* (2013.01); *B01J 2219/0059* (2013.01); *B01J 2219/00722* (2013.01); *B01J 2219/00781* (2013.01); *B01L 2400/0622* (2013.01); *B01L 2400/082* (2013.01)

(58) Field of Classification Search
CPC ......... B01L 3/502746; B01L 3/502738; B01L 2400/062; B01L 2400/02; B01L 2400/082; B01J 19/0046; B01J 19/0093; B01J 2219/0059; B01J 2219/00722; B01J 2219/00781

See application file for complete search history.

(56) References Cited

U.S. PATENT DOCUMENTS

2002/0048536 A1\* 4/2002 Bergh .................. B01L 3/5025
422/640
2012/0077260 A1\* 3/2012 Sharon ............. B01L 3/502746
422/82.05

OTHER PUBLICATIONS

Extended European Search Report and Written Opinion, Application No. EP20188567.0, mailed Dec. 21, 2020, 8 pages.

\* cited by examiner

*Primary Examiner* — Jill A Warden
*Assistant Examiner* — Alex Ramirez
(74) *Attorney, Agent, or Firm* — McDonnell Boehnen Hulbert & Berghoff LLP (57) ABSTRACT

A flow control system for a microfluidic device includes: a plurality of fluid flow controllers, each fluid flow controller associated with a respective microfluidic device inlet of the microfluidic device, and wherein each fluid flow controller includes: a controller inlet for receiving a fluid flow, a first fluid channel and a second fluid channel, each of the first and the second fluid channels having a first end connected to the controller inlet and a second end connected to a supply channel, and a valve for selecting the fluid flow to be passed from the controller inlet to the first fluid channel or to the second fluid channel, wherein the first fluid channel has a first flow resistance that smaller than a second flow resistance of the second fluid channel.

17 Claims, 4 Drawing Sheets

FLOW CONTROL SYSTEM FOR A MICROFLUIDIC DEVICE, MICROREACTOR SYSTEM, DNA SYNTHESIS DEVICE, AND METHOD FOR CONTROLLING A SEQUENCE OF REACTIONS

CROSS-REFERENCE TO RELATED APPLICATIONS

The present application is a non-provisional patent application claiming priority to European Patent Application No. EP 20188567.0, filed Jul. 30, 2020, the contents of which are hereby incorporated by reference.

TECHNICAL FIELD

The present disclosure relates to a flow control system for a microfluidic device. The flow control system may be used in a microreactor system for controlling a sequence of reactions in a microfluidic reaction chamber.

BACKGROUND

Microfluidic devices are miniaturized devices which allow e.g. analyzing chemical reactions in a very small scale and compact system. The microfluidic devices may be used e.g. for mixing fluids and reagents in a small volume for analysis of reactions.

In microfluidic devices, fluids may be transported to a reaction chamber. Thus, a first fluid and a second fluid may be sequentially provided into the reaction chamber. It is desired to enable fast and well-controlled replacement of the fluids in the reaction chamber.

In particular, for chemical reactions such as DNA synthesis, multiple reagents may be loaded and washed from the reaction chamber in sequence quickly (to increase throughput) and in high purity (to reduce error in synthesis). High purity levels may be achieved using microfluidic valves arranged external to a chip providing the reaction chamber. In such case, replacement of fluids may take a very long time due to a high dead volume to be replaced.

The microfluidic device may be disposable and may therefore be relatively simple to manufacture. In this regard, control of fluid flow to the reaction chamber may be provided externally to the microfluidic device. However, it is desired that the control of fluid flow is provided so as to still enable fast replacement of fluids in the reaction chamber.

SUMMARY

Described herein are a variety of embodiments that provide fluid flow control in a manner that facilitates fast switching of fluids in a reaction chamber of a microfluidic device.

According to a first aspect, there is provided a flow control system for a microfluidic device, the flow control system comprising: a plurality of fluid flow controllers, each fluid flow controller being configured to be associated with a microfluidic device inlet of the microfluidic device, wherein each fluid flow controller comprises: a controller inlet for receiving a fluid flow, a first fluid channel having a first end connected to the controller inlet and second end connected to a supply channel, a second fluid channel having a first end connected to the controller inlet and a second end connected to the supply channel, and a valve for selecting the fluid flow to be passed from the controller inlet to the first fluid channel or the second fluid channel, wherein the first fluid channel has a first flow resistance and the second fluid channel has a second flow resistance, wherein the first flow resistance is smaller than the second flow resistance.

Thanks to the flow control system described herein, flow to a supply channel may be easily switched between different flow rates. By the valve selecting fluid flow to be passed through different paths, using the first fluid channel or the second fluid channel, having different flow resistances, the flow rate provided to the supply channel may be switched. The supply channel may feed the microfluidic device inlet such that the flow rate provided to the microfluidic device inlet may be controlled based on a selection made by the valve. For instance, the fluid flow controller may be used for switching between a high flow mode associated with the first fluid channel and a low flow mode associated with the second fluid channel, wherein the high flow mode has a higher flow rate than the low flow mode since the first flow resistance is smaller than the second flow resistance.

The fluid flow controllers may be associated with separate microfluidic device inlets such that different fluid flow controllers are associated with different microfluidic device inlets. The plurality of fluid flow controllers may provide control of fluid flow being provided to a plurality of microfluidic device inlets. By further controlling the flow rates provided to different microfluidic device inlets, the flow control system may provide a system for controlling which particular fluid is to be provided to a microfluidic reaction chamber of the microfluidic device. Also, since the fluid flow controllers are associated with different microfluidic device inlets, different reagents may be provided through different microfluidic device inlets which ensures that there is no need to replace a high dead volume extending between the microfluidic device inlet and the reaction chamber.

The high flow mode and low flow mode that may be provided by the flow control system may further be adapted for ensuring that a fluid being supplied by one fluid flow controller in the high flow mode (while all other fluid flow controllers are set to a low flow mode) may provide a high purity of the fluid in a reaction chamber of the microfluidic device.

The flow control system may provide a control of different flow rates to be provided to microfluidic device inlets. Thus, according to an embodiment, the flow control system may be external to the microfluidic device so as to enable disconnecting the flow control system from the microfluidic device. This implies that the flow control system may be external to a chip on which the microfluidic device may be provided. In particular, the flow control system may facilitate use of a microfluidic device which may not include any on-chip valves.

The flow control system may be easily re-used for different specimen of a microfluidic device such that a relatively advanced fluid flow control may be provided externally to the microfluidic device and may be re-used. The microfluidic device may be disposable or only used a few times and, thanks to the flow control system providing an external flow control to the microfluidic device, the microfluidic device may be relatively inexpensive.

The flow control system is particularly useful with a microfluidic device wherein chamber inlets to a reaction chamber are provided with side drains. Thanks to each of the chamber inlets comprising a side drain, a high purity in the reaction chamber may be provided. The side drain may be configured to provide a flow away from the chamber inlet so as to prevent undesired diffusion of the fluid in the chamber inlet into the reaction chamber, if the chamber inlet is being supplied with a fluid which at the moment is not desired in the reaction chamber. Thus, the low flow mode of the flow control system may be adapted such that the flow rate of the undesired fluid in the chamber inlet may be set such that the fluid is entirely transported to the side drain. This implies that the chamber inlet may be filled by the undesired fluid from a reservoir connected to the fluid flow controller to the side drain. Hence, when a fluid in the reaction chamber is to be replaced, there is no need to replace a high dead volume before the fluid can reach the reaction chamber.

It should be realized that the valve may be configured to at least select fluid flow to be passed from the controller inlet to the first fluid channel or the second fluid channel. The valve may be further configured to provide further states to provide further different configurations of fluid flow. For instance, the valve may be further configured to select fluid flow to be passed to a third fluid channel, which may provide a third flow resistance, such that a flow rate provided to the supply channel may be selected between at least three different flow rates corresponding to the first, second, and third flow resistances. Also or alternatively, the valve may be further configured to select between at least a first and a second controller inlet for supplying fluid flow to the fluid flow controller. Also or alternatively, the valve may be further configured to select a closed state, wherein the valve is not connected to any of the first or the second fluid channels and wherein no fluid flow is provided to the supply channel.

The first and the second fluid channels may both be configured to provide fluid flow to the supply channel. The second end of the first fluid channel and the second end of the second fluid channel may both be connected to the supply channel at a common location. According to an embodiment, the second end of the first fluid channel and the second end of the second fluid channel are connected to the supply channel at a tee junction. This is an example manner of connecting the first and second fluid channels to the supply channel.

However, according to an alternative, the second end of the first fluid channel is connected to the supply channel at a first location and the second end of the second fluid channel is connected to the supply channel at a second location, the second location being different from the first location.

As used herein, the term "microfluidic device" should be construed as a device having structures in dimensions of mm-scale or less and which is configured to manipulate small volumes of fluid, such as in the order of ml or µl. The microfluidic device may comprise channels having a size (cross-section) in a range of 100 nm or less to 500 µm. The use of channels in such small dimensions allows a great number of channels in a small area, such that large amounts of information from analysis may be gathered from a small area of the device.

As used herein, the term "fluid" should be construed as any medium that is capable of flowing, such as a liquid or a gas. In some embodiments, the fluids may be liquids.

As used herein, the phrase "fluid flow controller configured to be associated with a microfluidic device inlet" should be construed as the fluid flow controller being able to be connected to the microfluidic device inlet, e.g. by connecting the supply channel of the fluid flow controller to the microfluidic device inlet.

According to an embodiment, the flow control system further comprises a plurality of reservoirs for different reagents, each reservoir being associated with a fluid flow controller for providing supply of fluid to the controller inlet, and a pressure source for pressurizing the plurality of reservoirs.

The reservoirs may provide reagents for providing a reaction or sequence of reactions in the microfluidic device. The plurality of reservoirs may ensure that a plurality of reagents to be used in a sequence of reactions may be provided. For instance, in DNA synthesis a number of different reagents may be included.

The flow control system may provide control of supply of reagents from the plurality of reservoirs. The flow control system may comprise a separate fluid flow controller for each of the reservoirs for controlling supply of each of the reagents to the microfluidic device.

The pressure source may pressurize the reservoirs and force fluid into tubing connected to the fluid flow controller. It should be realized that a single pressure source may be used for pressurizing the plurality of reservoirs, but according to an alternative, a plurality of pressure sources of a pressure delivery system may be provided.

According to an embodiment, the flow control system further comprises a valve control unit for controlling a state of each valve of the plurality of fluid flow controllers.

Thus, the state of the valves may be controlled by the valve control unit. The valve may select the fluid flow to be passed from the controller inlet to the first fluid channel or the second fluid channel in accordance with the state of the valve as controlled by the valve control unit.

The valve control unit may ensure that state of valves may be quickly switched through an automated control. Also, the valve control unit may provide simultaneous control of the state of each valve such that the states of a plurality of valves may be switched instantaneously. This may ensure that the flow control system may provide very fast control of fluid flows to a microfluidic device for facilitating quickly changing reagents being provided in reaction chambers of the microfluidic device.

The valve control unit may be configured to transmit control signals, e.g. electrical signals, to the valves for setting the state of the valves. Thus, the valve control unit may be connected by wire or wirelessly to the valves for providing control signals to the valves.

According to an embodiment, the flow control system further comprises an outlet connection being configured to be associated with a microfluidic device outlet of the microfluidic device, and an outlet valve being configured to select fluid flow from the outlet connection to be passed to a collection line or a waste line.

This implies that the microfluidic device outlet may be shared for fluids to be collected and waste to reduce a number of connections between the flow control system and the microfluidic device. The outlet valve allows fluid flow from the outlet connection to be passed to a collection line or waste line for selectively collecting the fluid from the microfluidic device or passing the fluid to waste.

The microfluidic device may be controlled such that output of substances to be collected may be controlled, such that the flow control system may also know when the outlet valve is to select fluid flow to be passed to the collection line. For instance, DNA strands from DNA synthesis may be formed by reactions in the microfluidic device and the flow control system may be controlled to ensure that fluid flow from the outlet connection is passed to the collection line when the microfluidic device is controlled to output the DNA strands.

According to a second aspect, there is provided a microreactor system comprising: the flow control system according to the first aspect, and a microfluidic device comprising a plurality of microfluidic device inlets, each being connected to a supply channel of the flow control system.

Effects and features of this second aspect are largely analogous to those described above in connection with the first aspect. Embodiments mentioned in relation to the first aspect are largely compatible with the second aspect.

Thus, the microreactor system comprising the flow control system of the first aspect and a microfluidic device facilitates fast replacement of fluids in a reaction chamber in the microfluidic device. In particular, the flow control system may be external to the microfluidic device, enabling the microfluidic device to be manufactured in an inexpensive manner. For instance, there may not be any valves in the microfluidic device.

The microfluidic device inlets may be connected to separate supply channels of the flow control system such that different microfluidic device inlets are connected to different supply channels.

According to an embodiment, the microfluidic device comprises a plurality of reaction chambers having chamber inlets and chamber outlets.

The plurality of reaction chambers of the microfluidic device may provide a high throughput through the microfluidic device as reactions may be provided in a plurality of reaction chambers. Thus, for increased throughput, the microreactor system may allow for reactions to be provided in parallel in a plurality of reaction chambers.

According to an embodiment, at least one of the microfluidic device inlets is branched into a plurality of channels for providing fluid flow into a chamber inlet of plural reaction chambers.

This implies that the same microfluidic device inlet may supply a plurality of reaction chambers. Hence, although a plurality of reaction chambers may be provided for an increased throughput of the microreactor system, the number of connections between the flow control system and the microfluidic device may be limited thanks to branching of microfluidic device inlets.

According to an embodiment, a chamber inlet is provided with a side drain, wherein the side drain is configured to provide a flow away from the chamber inlet so as to prevent undesired diffusion of the fluid in the chamber inlet into the reaction chamber.

The reaction chamber may desirably be supplied by fluid from only one chamber inlet at a time. The reaction chamber is further desirably to be provided with a high purity of the fluid. Thanks to the microfluidic device being provided with a side drain, fluid flow at chamber inlets providing presently undesired fluid may be directed to the side drain to ensure that the fluid does not reach the reaction chamber.

The side drains may facilitate supplying the chamber inlet with a fluid flow in a low flow mode, even when the fluid flow is not supposed to reach the reaction chamber. This implies that the chamber inlet may be filled by the undesired fluid to the side drain. Hence, when a fluid in the reaction chamber is to be replaced, there is no need to replace a high dead volume before the fluid can reach the reaction chamber.

According to an embodiment, each of the reaction chambers comprises a chamber outlet, wherein the chamber outlets of the reaction chambers are connected to a common microfluidic device outlet.

This implies that the same microfluidic device outlet may be used by a plurality of reaction chambers. Hence, although a plurality of reaction chambers may be provided for an increased throughput of the microreactor system, the number of connections between the flow control system and the microfluidic device may be limited thanks to chamber outlets being connected to a common microfluidic device outlet.

According to an embodiment, each reaction chamber comprises a plurality of chamber inlets, wherein each chamber inlet is associated with a separate fluid flow controller of the flow control system.

Thus, each reaction chamber is provided with a plurality of inlets for switching between different reagents in the reaction chamber. The reagent to be provided in the reaction chamber may be supplied through a particular chamber inlet and by switching the chamber inlet supplying the reaction chamber, the reagent is switched.

The fluid flow controllers may be set between a high flow mode or a low flow mode for each of the inlets, such that one chamber inlet is supplied in a high flow mode for supplying a desired reagent while all other chamber inlets may be supplied in a low flow mode.

According to an embodiment, each reaction chamber comprises a plurality of individual microarray sites, wherein the individual microarray sites are associated with separate electrodes for individually controlling reactions in the microarray sites of the reaction chamber.

This implies that each reaction chamber may be controlled such that microarray sites may be individually controlled. The electrodes of the microarray sites may selectively initiate a reaction in the microarray site for selecting whether a reaction is to occur in the microarray site. By individually controlling electrodes of different microarray sites, different reactions may be provided in different microarray sites.

For instance, incorporation of a nucleotide into a DNA molecule that may be immobilized on a surface of the microarray site may be selectively controlled using the electrodes of the microarray site. Hence, different DNA molecules may be formed in different microarray sites, by activating the electrodes of the different microarray sites at different steps in a sequence of reagents being provided to the reaction chamber.

According to an embodiment, the microfluidic device is arranged on a chip and wherein the flow control system is external to the chip.

This ensures that a chip providing the microfluidic device which may be disposable may be relatively inexpensive, whereas the more complicated flow control system may be re-used for multiple microfluidic devices.

According to a third aspect, there is provided a DNA synthesis device comprising the microreactor system according to the second aspect.

Effects and features of this third aspect are largely analogous to those described above in connection with the first and second aspects. Embodiments mentioned in relation to the first and second aspects are largely compatible with the third aspect.

DNA synthesis may include several different reagents being provided to a reaction chamber in a number of sequential steps. Thanks to the microreactor system providing fast replacement of fluids and facilitating high throughput in a plurality of reaction chambers, the microreactor system may be particularly useful for DNA synthesis.

However, it should be realized that the microreactor system according to the second aspect may be used in other applications. For instance, the microreactor system may be used for providing reactions in a combinatorial chemistry application.

According to a fourth aspect, a DNA memory or storage device is provided comprising the microreactor system according to the second aspect.

Effects and features of this fourth aspect are largely analogous to those described above in connection with the first, second, and third aspects. Embodiments mentioned in relation to the first, second, and third aspects are largely compatible with the fourth aspect.

The microreactor system comprising a microfluidic device may be used in a DNA memory or storage device, since the microfluidic device provides very quick replacement of fluids in the reaction chamber, which may be used, for example, for providing fast write processes in a DNA memory or storage device. Also, the microfluidic device may comprise a number of memory units, such as microarray sites in the reaction chambers.

According to a fifth aspect, there is provided a method for controlling a sequence of reactions in a microfluidic reaction chamber, the method comprising: in a first step of the sequence: controlling a first fluid flow controller providing fluid flow to a first inlet of the reaction chamber, wherein the first fluid flow controller is controlled to pass fluid flow through a first fluid channel of the first fluid flow controller having a small flow resistance such that fluid flow is provided in a high flow mode to the first inlet, and controlling a second fluid flow controller providing fluid flow to a second inlet of the reaction chamber, wherein the second fluid flow controller is controlled to pass fluid flow through a second fluid channel of the second fluid flow controller having a large flow resistance such that fluid flow is provided in a low flow mode to the second inlet; and in a second step of the sequence: controlling the first fluid flow controller to pass fluid flow through a second fluid channel of the first fluid flow controller having a large flow resistance such that fluid flow is provided in a low flow mode to the first inlet, and controlling the second fluid flow controller to pass fluid flow through a first fluid channel of the second fluid flow controller having a small flow resistance such that fluid flow is provided in a high flow mode to the second inlet.

Effects and features of this fifth aspect are largely analogous to those described above in connection with the first, second, third, and fourth aspects. Embodiments mentioned in relation to the first, second, third, and fourth aspects are largely compatible with the fifth aspect.

Thus, the supply of fluid into a reaction chamber may be controlled by switching fluid flow controllers to provide a low flow mode or high flow mode to the reaction chamber. Thanks to the use of the first and second fluid channel of each of the fluid flow controllers, the fluid flow controllers may simply be switched between low flow mode and high flow mode by selectively passing fluid flow through the first or second fluid channel.

It should be realized that the method may involve a plurality of fluid flow controllers being controlled for providing control of a plurality of fluid flows to a plurality of inlets of the reaction chamber. At each step of the sequence, one fluid flow controller may be controlled to provide fluid flow in a high flow mode while all other fluid flow controllers may be controlled to provide fluid flow in a low flow mode.

According to an embodiment, the sequence is controlled for providing DNA synthesis in the microfluidic reaction chamber.

The method may be particularly suitable for providing DNA synthesis, since DNA synthesis may include several different reagents being provided to a reaction chamber in a number of sequential steps.

The above and other characteristics and features will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE DRAWINGS

The above, as well as additional objects, features and benefits of the present disclosure, will be better understood through the following illustrative and non-limiting detailed description, with reference to the appended drawings. In the drawings like reference numerals will be used for like elements unless stated otherwise.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable with their antonyms under appropriate circumstances and that the embodiments described herein are capable of operation in other orientations than described or illustrated herein.

It is to be noticed that the term "comprising", used in the claims, should not be interpreted as being restricted to the features listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising A and B" should not be interpreted as being limited to devices consisting only of components A and B.

It means that with respect to the present disclosure, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, understood methods, structures, and techniques have not been shown in detail in order not to obscure an understanding of this description.

Figure 1:
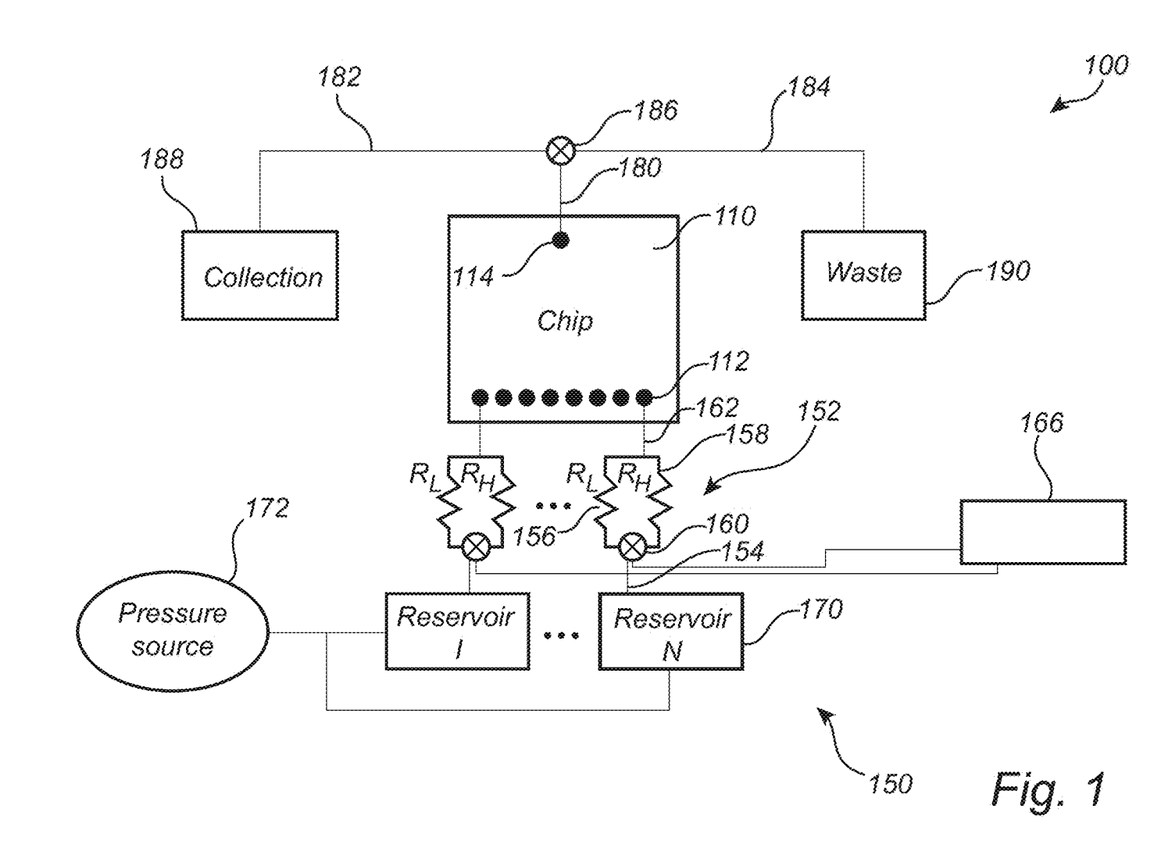
FIG. 1 is a schematic view of a microreactor system according to an example embodiment.

FIG. 1 illustrates a microreactor system 100 comprising a microfluidic device 110 and a flow control system 150. The flow control system 150 may be configured for controlling fluid flow being provided to a plurality of microfluidic device inlets 112 of the microfluidic device 110.

As illustrated in FIG. 1, the microfluidic device 110 may be formed on a substrate, e.g. a chip, and the flow control system 150 may be external to the substrate. The flow control system 150 may be configured to provide external control of fluid flow in the microfluidic device 110 such that the microfluidic device 110 does not include any on-chip valves. However, it should be realized that the flow control system 150 or at least parts of the flow control system 150 may alternatively be provided on the same substrate as the microfluidic device 110.

The microfluidic device 110 may include electronic circuitry, for example for providing sensors for performing measurements or acquiring information relating to reactions occurring in the microfluidic device 110 or for controlling reactions occurring in the microfluidic device 110.

The microfluidic device 110 may comprise at least one reaction chamber in which a reaction or a sequence of reactions may occur. The reaction chamber may be supplied with different fluids in a sequence for providing a specified reaction in the reaction chamber. The flow control system 150 may be configured to control fluid flow to the reaction chamber for controlling replacement of fluids in the reaction chambers.

The microfluidic device 110 may comprise a plurality of microfluidic device inlets 112. Each microfluidic device inlet 112 may be associated with a separate fluid flow controller 152 of the flow control system 150. The fluid flow controller 152 may supply the microfluidic device inlet 112 with a specific fluid, such that each microfluidic device inlet 112 is dedicated to receiving a specific fluid or reagent. A microfluidic device inlet 112 may further be associated with a chamber inlet of the reaction chamber, which is separate from another chamber inlet of the reaction chamber with which another microfluidic device inlet 112 is associated. Thus, the supply of a fluid or reagent to the microfluidic device inlet 112 controls the supply of the fluid to the reaction chamber through the associated chamber inlet.

Each fluid flow controller 152 may comprise a controller inlet 154 for receiving a fluid flow. The controller inlet 154 of each fluid flow controller 152 may be connected to an individual reservoir 170 for receiving a specific reagent.

Each fluid flow controller 152 may further comprise a first fluid channel 156 and a second fluid channel 158 and a valve 160. The controller inlet 154 and the first and second fluid channels 156, 158 may be connected to the valve 160, such that the valve 160 may be configured to select fluid flow to be passed from the controller inlet 154 [152] to the first fluid channel 156 or the second fluid channel 158.

Thus, the valve 160 may be a three-port, two-way valve that may switch a common inlet (the controller inlet 154) to two separate outlets (the first and the second fluid channels 156, 158).

The first and second fluid channels 156, 158 may have different flow resistances, the flow resistance of the first fluid channel 156 being smaller than the flow resistance of the second fluid channel 158. Hence, the first fluid channel 156 may have a low flow resistance and the second fluid channel 158 may have a high flow resistance.

The flow resistance of a fluid channel may be dependent on dimensions of the fluid channel. For instance, a length of the fluid channel and dimensions of a cross-section of the fluid channel may affect the flow resistance. Hence, the first and second fluid channels 156, 158 may have different length and/or different cross-sections such that the flow resistance of the first fluid channel 156 is smaller than the flow resistance of the second fluid channel 158. For instance, the first fluid channel 156 may be shorter than the second fluid channel 158. Additionally or alternatively, the first fluid channel 156 may have a larger cross-section than the second fluid channel 158. The first and the second fluid channels 156, 158 may have similar shapes of the cross-section, i.e. both the first and the second fluid channels 156, 158 may have a rectangular or circular cross-section with the first fluid channel 156 having larger dimensions than the second fluid channel 158. Alternatively, the first and the second fluid channels 156, 158 may have different shapes of the cross-section.

Each of the first fluid channel 156 and the second fluid channel 158 may further be connected to a supply channel 162. Thus, the valve 160 may be configured to select whether fluid flow between the controller inlet 154 and the supply channel 162 is to pass through the first fluid channel 156 or the second fluid channel 158. Since the first fluid channel 156 has a lower flow resistance than the second fluid channel 158, a selection of fluid flow being passed through the first fluid channel 156 implies that a high flow mode may be provided to the supply channel 162, whereas a selection of fluid flow being passed through the second fluid channel 158 implies that a low flow mode may be provided to the supply channel 162.

The supply channel 162 may be connected to the microfluidic device inlet 112 associated with the fluid flow controller 152. Thus, the valve 160 of the fluid flow controller 152 may be switched for switching supply of fluid flow to the microfluidic device inlet 112 between a high flow mode and a low flow mode.

The first fluid channel 156 may have a first end connected to the controller inlet 154 via the valve 160 and a second end connected to the supply channel 162. Thus, the first fluid channel 156 extends between the first and the second end and dimensions of the first fluid channel 156 between the first and the second end may define the flow resistance of the first fluid channel 156.

The second fluid channel 158 may have a first end connected to the controller inlet 154 via the valve 160 and a second end connected to the supply channel 162. Thus, the second fluid channel 158 extends between the first and the second end and dimensions of the second fluid channel 158 between the first and the second end may define the flow resistance of the second fluid channel 158.

The first fluid channel 156 and the second fluid channel 158 may be connected to the supply channel 162 in a common location. Thus, a tee junction 164 may be provided in which the first fluid channel 156, the second fluid channel 158 and the supply channel 162 are connected.

According to an alternative, the first and second fluid channels 156, 158 may be connected to the supply channel 162 in different locations.

The valve 160 may be configured to select between a first state in which fluid flow is passed through the first fluid channel 156 for providing a high flow mode and a second state in which fluid flow is passed through the second fluid channel 158 for providing a low flow mode. However, it should be realized that the valve 160 may further be configured to be set into further states. Thus, the valve 160 may be configured to be set into a third state in which fluid flow to the supply channel 162 is closed. Further, the valve 160 may be configured to be set into a fourth state in which fluid flow is passed through a third channel having a different flow resistance than the first and second fluid channels 156, 158. Thus, the valve 160 may provide selection between at least three different rates of fluid flow being provided to the supply channel 162.

The flow control system 150 may further comprise a valve control unit 166. The valve control unit 166 may be configured to control a state of each valve 160 of the plurality of fluid flow controllers 152. The valve control unit 166 may be configured to transmit control signals, e.g. electrical signals, to the valves 160 for setting the state of the valves 160. Thus, the valve control unit 166 may be connected by wire or wirelessly to the valves 160 for providing control signals to the valves 160. The valves 160 may comprise an actuator that may switch the state of the valve 160 based on receipt of a control signal.

The valve control unit 166 may be implemented as a processing unit, such as a central processing unit (CPU), which may execute the instructions of one or more computer programs in order to implement functionality of the valve control unit 166.

The valve control unit 166 may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the valve control unit 166.

The valve control unit 166 may for instance be programmable for providing a sequence of states of the valves 160 so as to provide a sequence of reagents into a reaction chamber of the microfluidic device 110.

As mentioned above, each fluid flow controller 152 may be connected to an individual reservoir 170 for receiving a specific reagent. The flow control system 150 may comprise a plurality of reservoirs 170 for different reagents. The flow control system 150 may further comprise a pressure delivery system comprising at least one pressure source 172 for pressurizing the plurality of reservoirs 170. The at least one pressure source 172 may be controlled for providing a constant pressure in each reservoir 170 such that a fluid flow rate through the supply channel 162 of a fluid flow controller 152 is only affected by the selection of fluid being passed through the first fluid channel 156 or the second fluid channel 158.

The flow control system 150 may further comprise an outlet connection 180 which may be configured to be connected to a microfluidic device outlet 114 for receiving an outlet fluid flow from the microfluidic device 110. The flow control system 150 may further comprise a collection line 182, a waste line 184 and an outlet valve 186. The outlet connection 180, the collection line 182, and the waste line 184 may be connected to the outlet valve 186, such that the outlet valve 186 may be configured to select fluid flow to be passed from the outlet connection 180 to the collection line 182 or the waste line 184.

Thus, the outlet valve 186 may be a three-port, two-way valve that may switch a common inlet (the outlet connection 180) to two separate outlets (the collection line 182 and the waste line 184).

This implies that the microfluidic device 110 may only include a single microfluidic device outlet 114 and that the outlet valve 186 may be switched for ensuring that substances of interest are collected from the microfluidic device 110, whereas waste fluids may be directly passed to waste. The collection line 182 and the waste line 184 may be connected to a collection reservoir 188 and a waste reservoir 190, respectively.

It should be realized that the microfluidic device 110 may alternatively comprise a plurality of microfluidic device outlets 114. For instance, the microfluidic device 110 may comprise a plurality of reaction chambers and each reaction chamber may be associated with a separate microfluidic device outlet 114. In such case, the flow control system 150 may comprise plural sets of outlet valves 186 for controlling fluid flow from each of the microfluidic device outlets 114.

The flow control system 150 may be re-used with different microfluidic devices 110. A first microfluidic device 110 being associated with the flow control system 150 may easily be replaced by a second microfluidic device 110 by disconnecting the microfluidic device inlets 112 of the first microfluidic device 110 from the supply channels 162 of the fluid flow controllers 152 and disconnecting the microfluidic device outlet 114 of the first microfluidic device 110 from the outlet connection 180 and then connecting the supply channels 162 of the fluid flow controllers 152 to microfluidic device inlets 112 of the second microfluidic device 110 and connecting the outlet connection 180 to the microfluidic device outlet 114 of the second microfluidic device 110.

Figure 2:
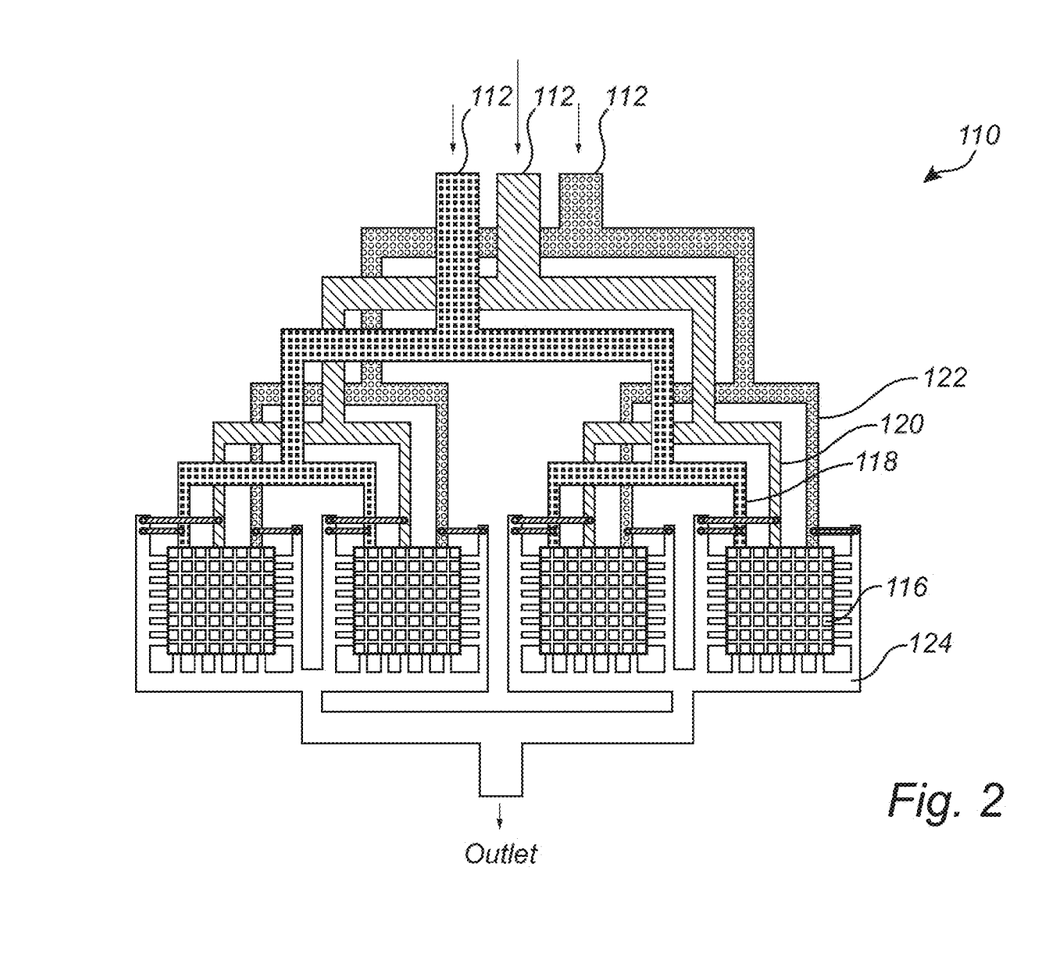
FIG. 2 is a schematic view of a microfluidic device according to an example embodiment.

Referring now to FIG. 2, an embodiment of the microfluidic device 110 will be described in further detail.

In order to increase throughput of the microfluidic device 110, an array of reaction chambers 116 may be utilized. The array of reaction chambers 116 may share common microfluidic device inlets 112. Thus, fluid flow provided to the inlets 112 may be distributed to the reaction chambers 116 in the array. The microfluidic device inlets 112 may thus be connected to an inlet channel which is branched into a plurality of channels. The reaction chambers 116 in the array may each be connected to one of the plurality of channels such that a chamber inlet 118 of each of the reaction chambers 116 in the array is connected to the microfluidic device inlet 112.

The microfluidic device 110 is illustrated in FIG. 2 as comprising four different reaction chambers 116, but it should be realized that the microfluidic device 110 may comprise many more reaction chambers 116, which may all be arranged in a line or may be spread out in two dimensions. However, it should also be realized that the microfluidic device 110 may not include a plurality of reaction chambers 116. Rather, in an alternative embodiment, the microfluidic device 110 may include a single reaction chamber 116.

Thanks to the branching of inlet channels, the microfluidic device inlet 112 may be shared by a plurality of reaction chambers 116 such that a number of connections between the flow control system 150 and the microfluidic device 110 may be limited even though the microfluidic device 110 may comprise a number of reaction chambers 116.

Each reaction chamber 116 may comprise a plurality of chamber inlets 118, 120, 122. The reaction chambers 116 are illustrated in FIG. 2 as comprising three chamber inlets 118, 120, 122, but it should be realized that the reaction chambers 116 may comprise a number of chamber inlets, such as ten different chamber inlets.

Each chamber inlet 118, 120, 122 of the reaction chamber 116 may be associated with a separate fluid flow controller 152 through the chamber inlets 118, 120, 122 being connected to separate microfluidic device inlets 112. A fluid flow rate of the chamber inlets 118, 120, 122 may thus be controlled by the associated fluid flow controller 152. The fluid flow controller 152 may for instance control a fluid flow rate between a high flow mode and low flow mode, which may be used for controlling the fluid to be provided in the reaction chamber 116.

Each reaction chamber 116 may further comprise at least one chamber outlet 124. The chamber outlets 124 of the reaction chambers 116 of the array may be connected to a common microfluidic device outlet 114. Thus, the chamber outlets 124 may be connected to an outlet collection network that connects the chamber outlets 124 in a number of connection points to the common microfluidic device outlet 114.

Figure 3:
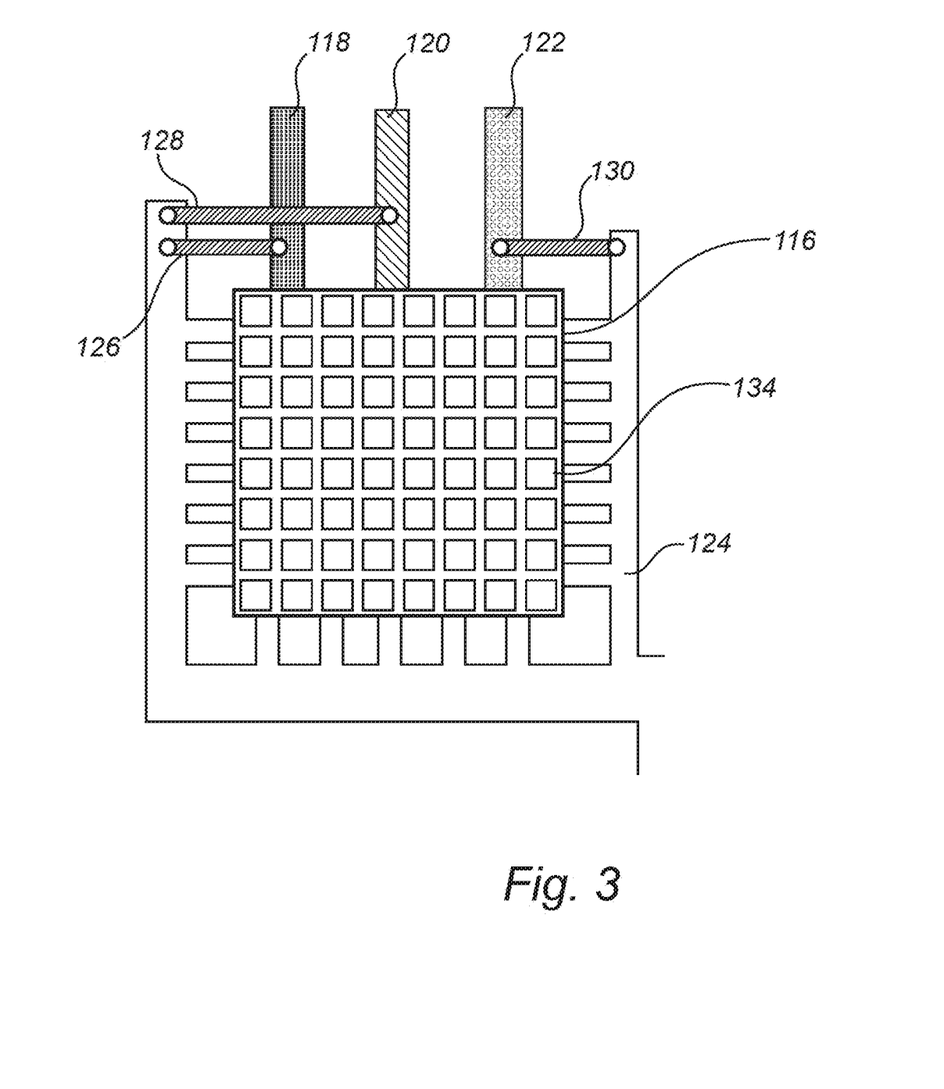
FIG. 3 is a schematic view of a reaction chamber of a microfluidic device according to an example embodiment.

Referring now to FIG. 3, a reaction chamber 116 will be described in further detail.

As mentioned above, the reaction chamber 116 may be supplied with fluids from a plurality of chamber inlets 118, 120, 122. As shown in FIG. 3, a first chamber inlet 118, a second chamber inlet 120, and a third chamber inlet 122 may be provided. However, it should be realized that at least two chamber inlets may be provided, and, in some embodiments, many more than three chamber inlets may be provided. The chamber inlets 118, 120, 122 may provide supply of different fluids into the reaction chamber 116.

Each chamber inlet 118, 120, 122 may further be provided with a side drain 126, 128, 130. The side drain 126, 128, 130 may be connected to the channel providing supply of fluid flow from the microfluidic device inlet 112, such that the side drain 126, 128, 130 is connected between the microfluidic device inlet 112 and the reaction chamber 116. The side drain 126, 128, 130 is connected to the chamber inlet 118, 120, 122, i.e. to a channel that is dedicated to a specific reaction chamber 116. Hence, the side drain 126, 128, 130 may be provided close to the reaction chamber 116.

The side drain 126, 128, 130 may be configured to provide a flow away from the chamber inlet 118, 120, 122. This implies that, when the reaction chamber 116 is filled by a first fluid from the first chamber inlet 118, the first fluid may exit the reaction chamber 116 through the side drain 128 of the second chamber inlet 120. This implies that the first fluid will flow from the reaction chamber 116 to the side drain 128 of the second chamber inlet 120 and, hence, prevent diffusion of a second fluid supplied through the second chamber inlet 120 into the reaction chamber 116.

Hence, the side drains 126, 128, 130 may ensure a high purity of a fluid in the reaction chamber 116. The fluid flow rate in the chamber inlets 118, 120, 122 may be controlled such that one chamber inlet is supplied in a high flow mode and the other chamber inlets are supplied in a low flow mode. Then, the side drains 126, 128, 130 may ensure that fluids that are not desired to reach the reaction chamber may be drained through the side drains 126, 128, 130 such that a high purity of a fluid in the reaction chamber 116 may be achieved without stopping flow of the second fluid and third and further fluids when the reaction chamber 116 is filled by the first fluid.

The low flow mode provided by the fluid flow controller 152 may be adapted such that the flow rate of the undesired fluid in the chamber inlet 118, 120, 122 may be set such that the fluid is entirely transported to the side drain 126, 128, 130.

The reaction chamber 116 may further comprise a plurality of chamber outlets 124. The chamber outlets 124 may be associated with a common main outlet connected to the microfluidic device outlet 114 such that the chamber outlets 124 may end in an interconnected channel, which may further lead to the main outlet. The side drains 126, 128, 130 may also be associated with the common main outlet.

The chamber outlets 124 may be provided with different hydraulic resistances. This implies that a resistance experienced by a second fluid which is to replace a first fluid in the reaction chamber 116 may be different in different directions from the second chamber inlet 120. Hence, the fluid front of the second fluid may propagate with different speeds in different directions. This may be utilized such that the reaction chamber 116 may be very quickly filled in the entire volume of the reaction chamber 116 by the second fluid when fluid replacement is performed. The fluid front may reach the chamber outlets 124 simultaneously or approximately simultaneously such that filling of the entire volume of the reaction chamber 116 by the second fluid is facilitated. Hence, the hydraulic resistance of a chamber outlet 124 that is associated with a large travel distance from a chamber inlet 118, 120, 122 may be set to be low while the hydraulic resistance of a chamber outlet 124 that is associated with a short travel distance from a chamber inlet 118, 120, 122 may be set to be high. Thus, if a second chamber outlet is arranged farther away from the first chamber inlet 118, the second chamber inlet 120, and the third chamber inlet 122 than a first chamber outlet, the second chamber outlet may be provided with a lower hydraulic resistance than the first chamber outlet.

The reaction chamber 116 may further comprise a plurality of individual microarray sites 134. Each microarray site 134 may be addressed separately using separate electrodes associated with the microarray site 134. The electrodes of the microarray site 134 may selectively initiate a reaction in the microarray site 134 for selecting whether a reaction is to occur in the microarray site 134. For instance, by application of an electric field in the microarray site 134, a reaction may be initiated. Hence, if no reaction with a fluid in the reaction chamber 116 is desired for a particular microarray site 134, the electrodes of the microarray site 134 may be inactive.

Thus, the use of microarray sites 134 in the reaction chamber 116 allows for providing different reactions in different microarray sites 134 within the reaction chamber 116.

For instance, incorporation of a nucleotide into a DNA molecule that may be immobilized on a surface of the microarray site 134 may be selectively controlled using the electrodes of the microarray site 134. Hence, each microarray site 134 may be capable of synthesizing a specified DNA molecule by the activation of an electric field in the microarray site 134 in association with a sequence of reagents being provided to the reaction chamber 116.

As shown in FIG. 3, an 8×8 array of microarray sites 134 may be provided in the reaction chamber 116. However, it should be realized that the array may comprise fewer or many more microarray sites 134, e.g. 100×100 microarray sites 134.

The supply of fluids into the reaction chamber 116 may be used e.g. for sequentially filling the reaction chamber 116 with different fluids. Thus, a sequence of reagents may for instance be loaded and washed from the reaction chamber 116, which may be used in various applications, such as for DNA synthesis.

Thus, according to an embodiment, the microreactor system 100 may form a DNA synthesis device, wherein DNA molecules may be synthesized in the reaction chambers 116 of the microfluidic device 110 by sequential supply of reagents from the flow control system 150.

According to another embodiment, the microreactor system 100 may form a device for combinatorial chemistry, wherein a sequence of reagents is provided by the flow control system 150 into the reaction chambers 116 of the microfluidic device 110 for providing a sequence of chemical reactions.

Figure 4:
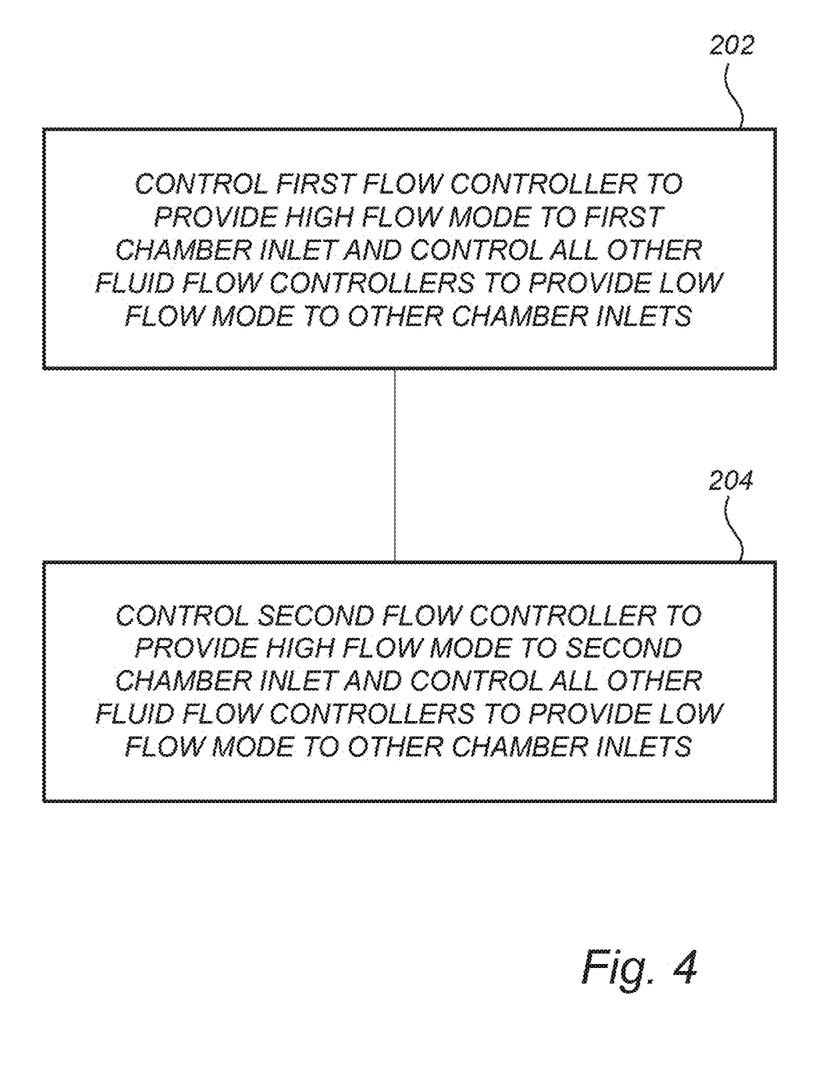
FIG. 4 is a flow chart of a method according to an example embodiment.

Referring now to FIG. 4, a method for controlling a sequence of reactions in a reaction chamber 116 is described.

The reaction chamber 116 is supplied with a sequence of reagents in a plurality of steps. In each step of the sequence, a single fluid may be supplied to the reaction chamber 116.

The supply of reagents to the reaction chamber 116 may be provided using fluid flow controllers 152 associated with different chamber inlets 118, 120, 122 of the reaction chamber 116. The fluid flow controllers 152 may selectively provide a high flow mode or a low flow mode to the chamber inlets 118, 120, 122.

Thus, in a first step 202 of the sequence, a first fluid flow controller 152 providing fluid flow to a first chamber inlet 118 of the reaction chamber 116 is controlled to provide a high flow mode to the first chamber inlet 118, and all other fluid flow controllers 152 are controlled to provide a low flow mode to the other chamber inlets 120, 122.

In a second step 204 of the sequence, a second fluid flow controller 152 providing fluid flow to a second chamber inlet 120 of the reaction chamber 116 is controlled to provide a high flow mode to the second chamber inlet 120, and all other fluid flow controllers 152 are controlled to provide a low flow mode to the other chamber inlets 118, 122.

Thus, fluids may be provided in similar manner in a number of steps in the sequence, wherein a fluid may be provided several times into the reaction chamber 116 during the sequence.

It should be understood that some of the fluids that are provided into the reaction chamber 116 may not actively be part of the sequence of reactions. Thus, between supplying of a first reagent and supplying of a second reagent into the reaction chamber 116, a wash buffer or even a sequence of different wash buffers may be introduced into the reaction chamber 116.

Further, in DNA synthesis, a preparation buffer or a sequence of different preparation buffers may be introduced into the reaction chamber 116 before a nucleotide is introduced. Also, after introduction of a nucleotide, a post buffer or a sequence of post buffers may be introduced into the reaction chamber 116 to prevent undesired incorporation of nucleotides into the synthesized DNA molecule. Finally, after the DNA molecule has been fully synthesized, a release reagent may be introduced for releasing the DNA molecule form the reaction chamber 116. At such stage, the outlet valve 186 may be switched from passing fluid flow to the waste reservoir 190 to passing fluid flow to the collection reservoir 188.

In the above the description has mainly been made with reference to a limited number of examples. However, as is readily appreciated by a person skilled in the art, other examples than the ones disclosed above are also possible.

For instance, the microfluidic device inlet 112 may not be shared by a plurality of reaction chambers 116. Rather, each chamber inlet 118, 120, 122 of each reaction chamber 116 may be associated with a separate microfluidic device inlet 112.

It is to be understood that although examples embodiments, specific constructions and configurations, as well as materials, have been discussed herein for devices according to the present disclosure, various changes or modifications in form and detail may be made without departing from the scope and technical teachings of this disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A flow control system for a microfluidic device, the flow control system comprising:
  a plurality of fluid flow controllers, wherein each fluid flow controller is associated with a respective microfluidic device inlet of the microfluidic device, and wherein each fluid flow controller comprises:
    a controller inlet for receiving a fluid flow,
    a first fluid channel having a first end connected to the controller inlet and a second end connected to a supply channel, a second fluid channel having a first end connected to the controller inlet and a second end connected to the supply channel, and a valve for selecting the fluid flow to be passed from the controller inlet to the first fluid channel or to the second fluid channel, wherein the first fluid channel has a first flow resistance and the second fluid channel has a second flow resistance, and wherein the first flow resistance is smaller than the second flow resistance; and a valve control unit for controlling a state of each valve of the plurality of fluid flow controllers, wherein the valve control unit is configured to:

during a first step of a sequence, (i) control a first fluid flow controller of the plurality of fluid flow controllers to pass fluid flow from the controller inlet of the first fluid flow controller to the first fluid channel of the first fluid flow controller such that the first fluid flow controller provides fluid flow to the supply channel of the first fluid flow controller in a high flow mode, and (ii) control a second fluid flow controller of the plurality of fluid flow controllers to pass fluid flow from the controller inlet of the second fluid flow controller to the second fluid channel of the second fluid flow controller such that the second fluid flow controller provides fluid flow to the supply channel of the second fluid flow controller in a low flow mode, and during a second step of the sequence, (i) control the first fluid flow controller of the plurality of fluid flow controllers to pass fluid flow from the controller inlet of the first fluid flow controller to the second fluid channel of the first fluid flow controller such that the first fluid flow controller provides fluid flow to the supply channel of the first fluid flow controller in the low flow mode, and (ii) control the second fluid flow controller of the plurality of fluid flow controllers to pass fluid flow from the controller inlet of the second fluid flow controller to the first fluid channel of the second fluid flow controller such that the second fluid flow controller provides fluid flow to the supply channel of the second fluid flow controller in the high flow mode.

2. The flow control system of claim 1, further comprising a plurality of reservoirs for different reagents, wherein each reservoir is associated with a respective fluid flow controller of the plurality of fluid flow controllers and is configured to provide a supply of fluid to the controller inlet of the respective fluid flow controller, and a pressure source for pressurizing the plurality of reservoirs.

3. The flow control system of claim 1, wherein the sequence is specified to result in DNA synthesis in a microfluidic reaction chamber of the microfluidic device.

4. The flow control system of claim 1, further comprising an outlet connection that is associated with a microfluidic device outlet of the microfluidic device, and an outlet valve that is configured to select fluid flow from the outlet connection to be passed to a collection line or to a waste line.

5. A microreactor system comprising:
a plurality of fluid flow controllers, and wherein each fluid flow controller comprises:
a controller inlet for receiving a fluid flow,
a first fluid channel having a first end connected to the controller inlet and a second end connected to a supply channel, a second fluid channel having a first end connected to the controller inlet and a second end connected to the supply channel, and a valve for selecting the fluid flow to be passed from the controller inlet to the first fluid channel or to the second fluid channel, wherein the first fluid channel has a first flow resistance and the second fluid channel has a second flow resistance, and wherein the first flow resistance is smaller than the second flow resistance; and a microfluidic device comprising a plurality of microfluidic device inlets, each being connected to a supply channel of the plurality of fluid flow controllers such that each fluid flow controller is associated with a respective microfluidic device inlet of the plurality of microfluidic device inlets, wherein the microfluidic device comprises a plurality of reaction chambers having chamber inlets and chamber outlets, wherein each reaction chamber comprises a respective plurality of chamber inlets, and wherein each chamber inlet of a particular reaction chamber of the plurality of reaction chambers is associated with a respective different fluid flow controller of the plurality of fluid flow controllers.

6. The microreactor system of claim 5, wherein at least one of the microfluidic device inlets is branched into a plurality of channels for providing fluid flow into the chamber inlets of the plurality of reaction chambers.

7. The microreactor system of claim 5, wherein a particular chamber inlet of a particular reaction chamber of the plurality of reaction chambers is provided with a side drain, and wherein the side drain is configured to provide a flow away from the particular chamber inlet so as to prevent diffusion of fluid in the particular chamber inlet into the particular reaction chamber.

8. The microreactor system of claim 5, wherein each of the reaction chambers comprises a respective chamber outlet, and wherein the chamber outlets of the reaction chambers are connected to a common microfluidic device outlet.

9. The microreactor system of claim 5, wherein each reaction chamber comprises a plurality of individual microarray sites, and wherein the individual microarray sites are associated with separate electrodes that are operable to individually control reactions in the microarray sites of the reaction chambers.

10. The microreactor system of claim 5, wherein the microfluidic device is arranged on a chip and wherein the plurality of fluid flow controllers is external to the chip.

11. The microreactor system of claim 5, further comprising a plurality of reservoirs for different reagents, wherein each reservoir is associated with a respective fluid flow controller of the plurality of fluid flow controllers and is configured to provide a supply of fluid to the controller inlet of the respective fluid flow controller, and a pressure source for pressurizing the plurality of reservoirs.

12. The microreactor system of claim 5, further comprising an outlet connection that is associated with a microfluidic device outlet of the microfluidic device, and an outlet valve that is configured to select fluid flow from the outlet connection to be passed to a collection line or to a waste line.

13. The microreactor system of claim 5, further comprising a valve control unit for controlling a state of each valve of the plurality of fluid flow controllers, wherein the valve control unit is configured to:

during a first step of a sequence, (i) control a first fluid flow controller of the plurality of fluid flow controllers to pass fluid flow from the controller inlet of the first fluid flow controller to the first fluid channel of the first fluid flow controller such that the first fluid flow controller provides fluid flow to the supply channel of the first fluid flow controller in a high flow mode, and (ii) control a second fluid flow controller of the plurality of fluid flow controllers to pass fluid flow from the controller inlet of the second fluid flow controller to the second fluid channel of the second fluid flow controller such that the second fluid flow controller provides fluid flow to the supply channel of the second fluid flow controller in a low flow mode, and during a second step of the sequence, (i) control the first fluid flow controller of the plurality of fluid flow controllers to pass fluid flow from the controller inlet of the first fluid flow controller to the second fluid channel of the first fluid flow controller such that the first fluid flow controller provides fluid flow to the supply channel of the first fluid flow controller in the low flow mode, and (ii) control the second fluid flow controller of the plurality of fluid flow controllers to pass fluid flow from the controller inlet of the second fluid flow controller to the first fluid channel of the second fluid flow controller such that the second fluid flow controller provides fluid flow to the supply channel of the second fluid flow controller in the high flow mode.

14. The microreactor system of claim 13, wherein the sequence is specified to result in DNA synthesis in a microfluidic reaction chamber of the plurality of reaction chambers.

15. A DNA synthesis device comprising:
a plurality of fluid flow controllers, wherein each fluid flow controller is associated with a respective microfluidic device inlet of the microfluidic device, and wherein each fluid flow controller comprises:
a controller inlet for receiving a fluid flow,
a first fluid channel having a first end connected to the controller inlet and a second end connected to a supply channel,
a second fluid channel having a first end connected to the controller inlet and a second end connected to the supply channel, and
a valve for selecting the fluid flow to be passed from the controller inlet to the first fluid channel or to the second fluid channel,
wherein the first fluid channel has a first flow resistance and the second fluid channel has a second flow resistance, and wherein the first flow resistance is smaller than the second flow resistance; and
a microfluidic device comprising a plurality of microfluidic device inlets, each being connected to a supply channel of the plurality of fluid flow controllers, wherein the microfluidic device comprises a plurality of reaction chambers having chamber inlets and chamber outlets, wherein each reaction chamber comprises a respective plurality of chamber inlets, and wherein each chamber inlet of a particular reaction chamber of the plurality of reaction chambers is associated with a respective different fluid flow controller of the plurality of fluid flow controllers.

16. A method for controlling a sequence of reactions in a microfluidic reaction chamber, the method comprising:
in a first step of the sequence:
controlling a first fluid flow controller to provide fluid flow to a first inlet of a reaction chamber, wherein the first fluid flow controller is controlled to pass fluid flow through a first fluid channel of the first fluid flow controller that has a small flow resistance such that fluid flow is provided in a high flow mode to the first inlet, and
controlling a second fluid flow controller to provide fluid flow to a second inlet of the reaction chamber, wherein the second fluid flow controller is controlled to pass fluid flow through a second fluid channel of the second fluid flow controller that has a large flow resistance such that fluid flow is provided in a low flow mode to the second inlet; and
in a second step of the sequence:
controlling the first fluid flow controller to pass fluid flow through a second fluid channel of the first fluid flow controller having a large flow resistance such that fluid flow is provided in a low flow mode to the first inlet, and
controlling the second fluid flow controller to pass fluid flow through a first fluid channel of the second fluid flow controller having a small flow resistance such that fluid flow is provided in a high flow mode to the second inlet.

17. The method of claim 16, wherein the sequence is specified to result in DNA synthesis in the microfluidic reaction chamber.

* * * * *